(12) United States Patent
Smith et al.

(10) Patent No.: US 6,443,013 B1
(45) Date of Patent: Sep. 3, 2002

(54) ROTARY TEST FIXTURE

(75) Inventors: Eric Alan Smith, Santa Cruz; Frank Kwong, Palo Alto, both of CA (US)

(73) Assignee: Samsung Electronics Co., Ltd., Suwon (KR)

( * ) Notice: Subject to any disclaimer, the term of this patent is extended or adjusted under 35 U.S.C. 154(b) by 9 days.

(21) Appl. No.: 09/632,465

(22) Filed: Aug. 4, 2000

(51) Int. Cl.[7] .................................................. B06B 3/00
(52) U.S. Cl. ...................................................... 73/663
(58) Field of Search .......................... 73/663, 664, 665, 73/666, 667, 668, 672, 865.3, 865.6, 432.1, DIG. 1

(56) References Cited

U.S. PATENT DOCUMENTS

| | | | | |
|---|---|---|---|---|
| 3,657,963 A | * | 4/1972 | Miller | 90/58 C |
| 4,947,067 A | * | 8/1990 | Habermann et al. | 73/668 |
| 5,544,528 A | * | 8/1996 | Woyski et al. | 73/665 |
| 5,644,087 A | * | 7/1997 | Liu | 73/663 |
| 5,801,311 A | | 9/1998 | Duell et al. | 73/514.37 |
| 5,948,987 A | * | 9/1999 | Liu | 73/663 |
| 6,190,032 B1 | * | 2/2001 | Choda | 366/208 |

* cited by examiner

Primary Examiner—Hezron Williams
Assistant Examiner—Rose M. Miller
(74) Attorney, Agent, or Firm—Gregory Smith & Associates; Jeffrey P. Aiello

(57) ABSTRACT

A rotational vibration testing device, including a rotating table, for testing both rotary shock and rotary vibration when used in conjunction with a pivoting shaker. The rotating table is mounted on a hub rotationally supported between two compression rings via tapered annular roller bearings preloaded in opposition. A motion arm connects to a radial arm on the side of the hub. The other end of the motion arm mounts to a height adjuster, which bolts to an electrodynamic shaker or other force generator. When the motion arm moves fore and aft, the linear acceleration is converted to rotational acceleration based on the radius from the stinger to the center of rotation. A nylon or equivalent median between the motion arm and the hub allows for sufficient flex without fore and aft play. The large tapered roller bearings preloaded in opposition eliminate z-axis acceleration and allow for greater payload testing.

14 Claims, 8 Drawing Sheets

ROTARY TEST FIXTURE

FIELD OF INVENTION

The present invention relates to a rotational vibration testing device for testing the affect on selected devices of both rotary shock and rotary vibration.

DESCRIPTION OF RELATED ART

It is desirable to test the resistance of certain portable devices to rotary shock and vibration, particularly devices with moving parts and small tolerances such as computer disk drives and the like. The analysis and testing of a disk drive system's ability to withstand rotational shock and vibration while in operation has become increasingly important as the portability of computer systems increases. Under some circumstance, rotary shock can be far more destructive than pure translational shock along an X, Y or Z axis. In testing disk drives, it is important to have a system that eliminates z-axis acceleration which could induce false drive failures and that has the ability to test disk drives of various payloads.

Disk drive manufacturer's increasingly perform testing to ensure that disk drives can withstand requisite levels of rotary shock and vibration. However, current conventional test systems have several drawbacks. For example, rotating tables found in the prior art tend to vibrate and/or precess upon application of a rotary shock to the outer circumference of the table. This vibrations and/or precession may result in a dampening of shock applied to the table.

Some pre-existing rotary shock testing devices utilize rotating tables mounted on bearing plates situated along the axis of rotation. These devices have the bearings located near the center of rotation and do not sufficiently control the z-axis acceleration, and the axis of rotation of these devices may be negatively affected by heavy payloads.

Another drawback of some current rotary shock testing systems relates to the uncontrolled variability of the shock delivery system. For example, many conventional rotary shock tables use a spring-based system for delivering the shock to the rotary table. The force applied by spring-based systems changes over the life of the spring. Other systems utilize pneumatic cylinders to impart a force on the system. However, the amount of force exerted onto the system varies with the varying gas pressure in the pneumatic cylinder and the position at which the cylinder piston strikes the unit.

What is needed is a rotary shock testing device that avoids the disadvantages of pre-existing rotary shock testing devices discussed above.

SUMMARY OF INVENTION

Accordingly, the present invention is a rotary test device for testing of both rotary shock and rotary vibration when used in conjunction with a 1200 lb force electrodynamic shaker that includes a hub with tapered annular roller bearings, in opposition, to support it between two compression rings. The compression rings are preloaded over the bearings to eliminate z-axis movement. A motion arm connects to a radial arm on the side of hub via flexible nylon or equivalent material. The other end of the motion arm mounts to a height adjuster, which bolts to the 1200 lb force electrodynamic shaker. When the motion arm moves fore and aft, the linear acceleration is converted to rotational acceleration based on the radius from the stinger to the center of rotation. The nylon or equivalent material median between the motion arm and the hub allows for sufficient rotational flex without fore and aft play. The large tapered annular roller bearings preloaded in opposition eliminate z-axis acceleration and allow for greater payloads to be tested. Using a hollow hub reduces rotational inertia providing better performance. Attaching the stinger near the center of mass of the hub reduces any induce moments that might contribute to undesired vectors of acceleration.

It is therefore an advantage of the present invention to provide a precise rotary test fixture.

It is a further advantage of the present invention to provide a larger bearing surface to control z-axis acceleration and to accommodate larger payloads.

It is a further advantage of the present invention to eliminate the variability of the force exerted on the rotary testing device by utilizing the precise control available with a shaker/controller system.

Still other advantages of the present invention will be readily apparent to those skilled in the art from the following detailed description, wherein I have shown and described the preferred embodiment by way of illustration of the best mode of the invention. Where appropriate, other embodiments have been discussed, however, still further alternative embodiments may be made without departing from the invention. Accordingly, the drawings and descriptions are to be regarded as illustrative in nature and not as restrictive.

BRIEF DESCRIPTION OF THE DRAWINGS

A preferred embodiment of the present invention is further described in connection with the accompanying drawings, in which.

DETAILED DESCRIPTION OF THE INVENTION

The following description is provided to enable any person skilled in the art to make and use the invention and sets forth the best mode presently contemplated by the inventor of carrying out his invention. Various modifications, however, will remain readily apparent to those skilled in the art, as generic principles of the present invention have been defined herein.

Reference will now be made in detail to a presently preferred embodiment of the invention as illustrated in the accompanying drawings. The drawings show a rotational vibration testing device, indicated generally by reference number 10.

Figure 1:
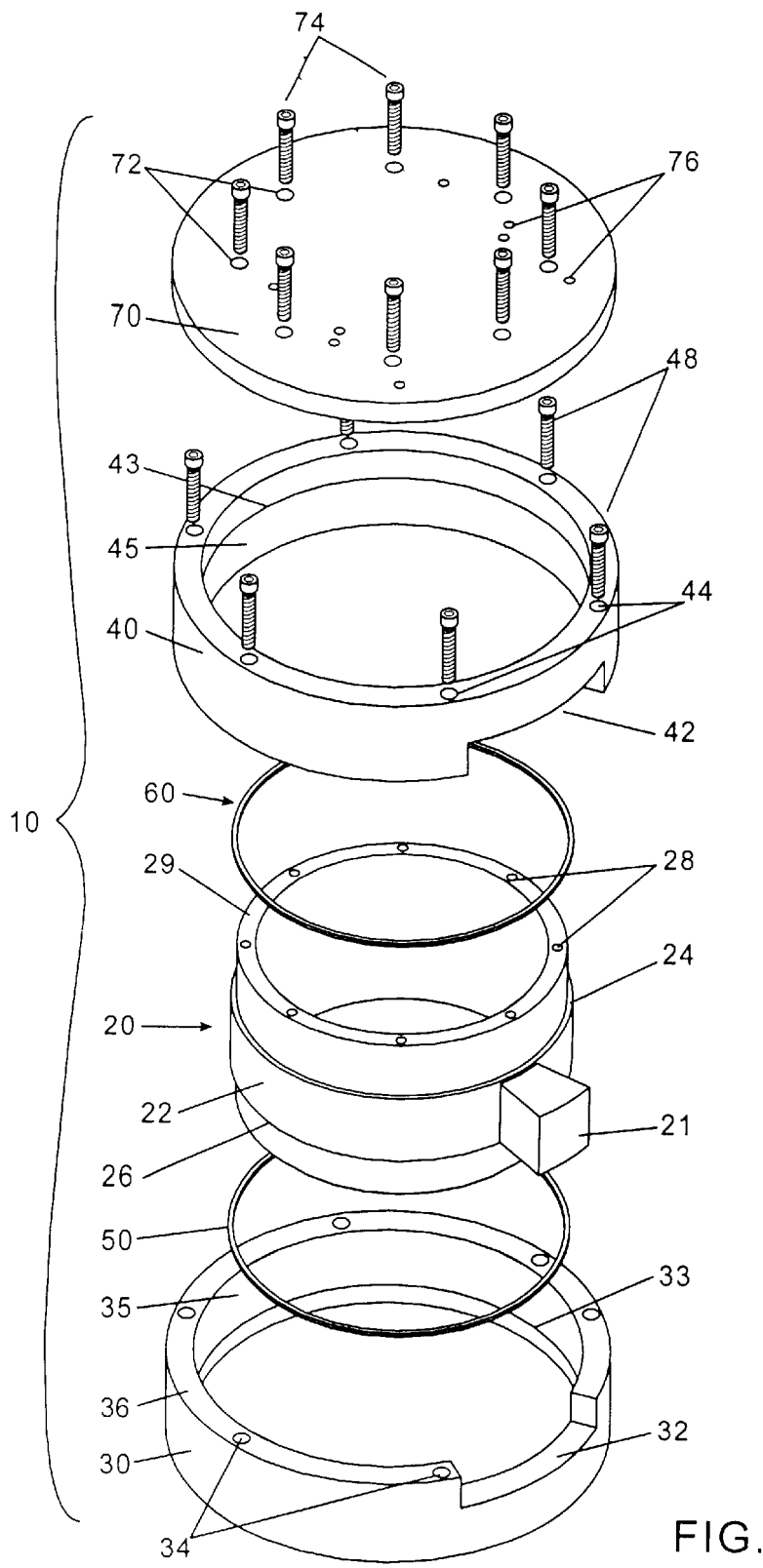
FIG. 1 is an exploded perspective view of a preferred embodiment rotational shock and vibration testing device.

In a preferred embodiment, as best seen in FIG. 1, the rotational vibration testing device 10 comprises a hub 20, a lower compression ring 30, an upper compression ring 40, a lower annular roller bearing 50, an upper annular roller bearing 60 and a rotating table 70. The hub 20, a lower compression ring 30, an upper and lower compression rings 40 and 30 may be fabricated from any durable and relatively light material, but preferably comprises aluminum that has been chemically treated to improve scratch resistance.

Figure 2:
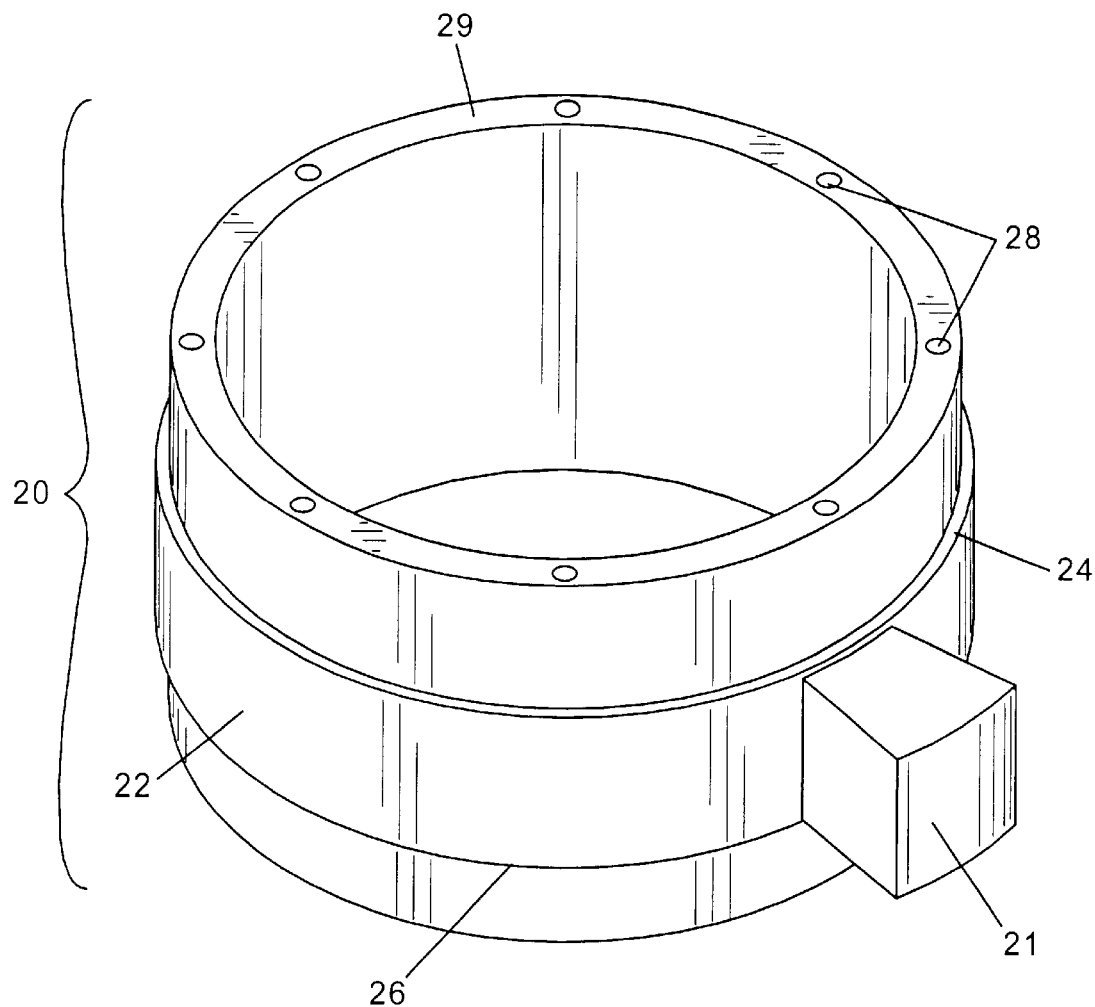
FIG. 2 is a perspective view of an embodiment of the hub of the rotational shock and vibration testing device.

FIG. 2 shows the hub 20 in isolation. The hub 20 preferably comprises a hollow cylinder with a first diameter, and including a raised collar 22 on the outer surface with a second larger diameter. Additionally, a radial arm 21 preferably protrudes from the raised collar. The difference between the diameter of the hub 20 and the diameter of the raised collar 22 defines a lower shoulder 26 and upper shoulder 24. The hub 20 preferably further includes eight threaded holes 28 equally spaced on the upper end 29 of the hub, although more or fewer holes may be used in alternate embodiments. The radial arm 21 is preferably positioned at or near the center of mass of the hub 20 in order to reduce any movement that may contribute to unwanted vibration or motion in undesired vectors. In alternate embodiments, the radial arm 21 may be positioned elsewhere. For example in some embodiments the radial arm may be positioned somewhat more toward the top end 29 of the hub 20 so that the radial arm 21 is positioned closer to the center of bass of the assembly comprising both the 20 hub and table 70.

The hub 20 is preferably hollow to reduce inertia. The radial arm 21, which projects outward from the outer circumference of the raised collar 22, is preferably welded to the outer surface of the raised collar, but in alternate embodiments the radial arm 21 and hub 20 may be coupled together by other acceptable means, or be formed as a single unitary piece.

The rotational vibration testing device 10 further preferably includes a lower annular tapered roller bearing 50 and an upper annular tapered roller bearing 60. Any desired annular bearing may be used, however, TIMKEN™ brand bearings, part numbers LL735449 and LL735410, have been found to be acceptable.

Figure 6:
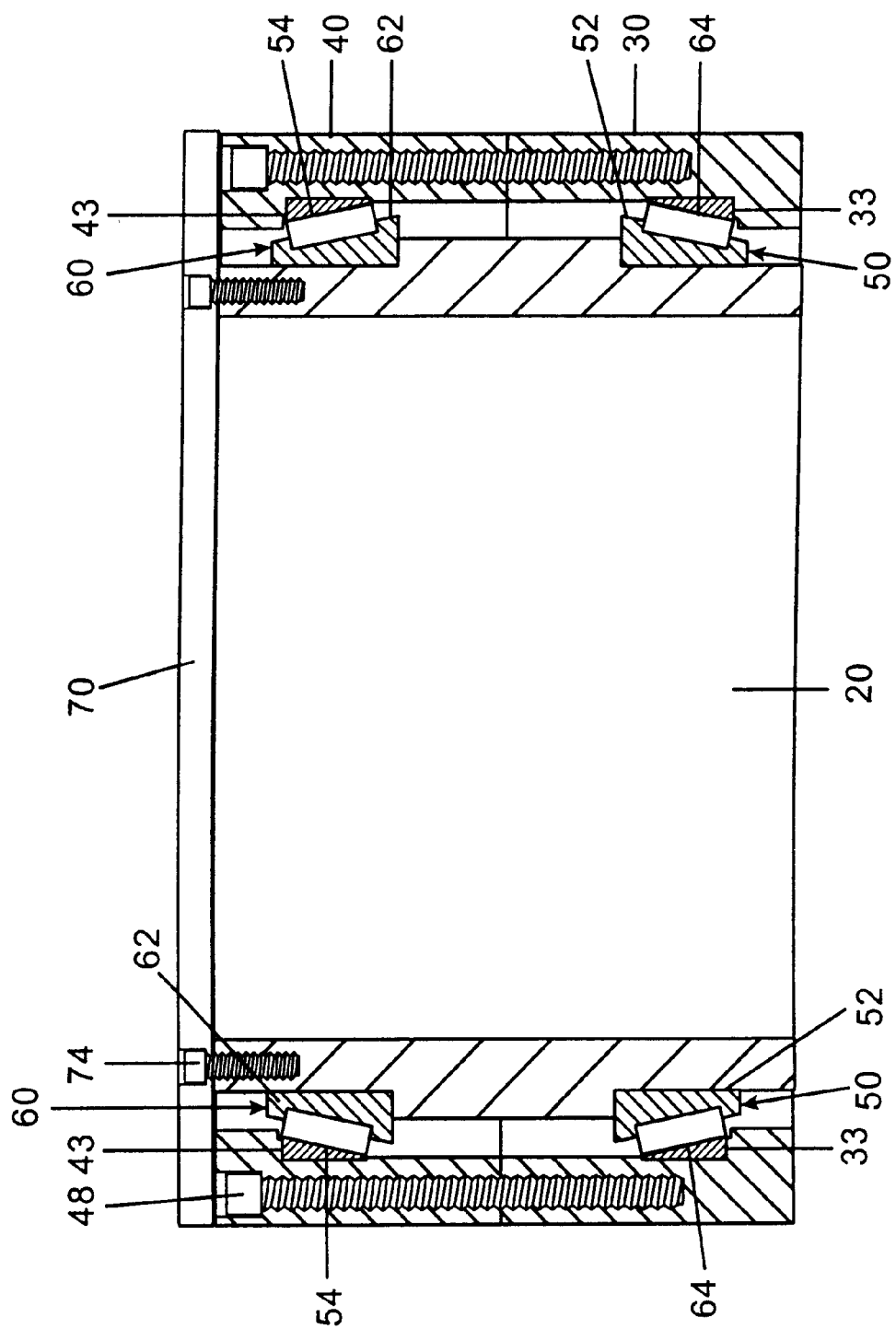
FIG. 6 is a cutaway view of the lower and upper compression rings rotationally supporting the hub of the rotational shock and vibration testing device.

Each bearing comprises a bearing cones 52 and 62 respectively, which are preferably installed so that they are oriented in opposition as seen in FIG. 6. The bearing cones 52 and 62 are preferably mechanically pressed onto the outer surface of the hub 20, with the lower bearing cone 52 in snug engagement with the lower shoulder 26 of the raised collar 22 and the upper bearing 62 in snug engagement with the upper shoulder 24 of the raised collar 22. In other known means for attaching the bearings to the hub may be used.

The bearing cups or surfaces 54 and 64 respectively are preferably mechanically pressed onto the inner surface of the upper compression ring and the lower compression ring respectively, as will be explained further below.

Figure 3:
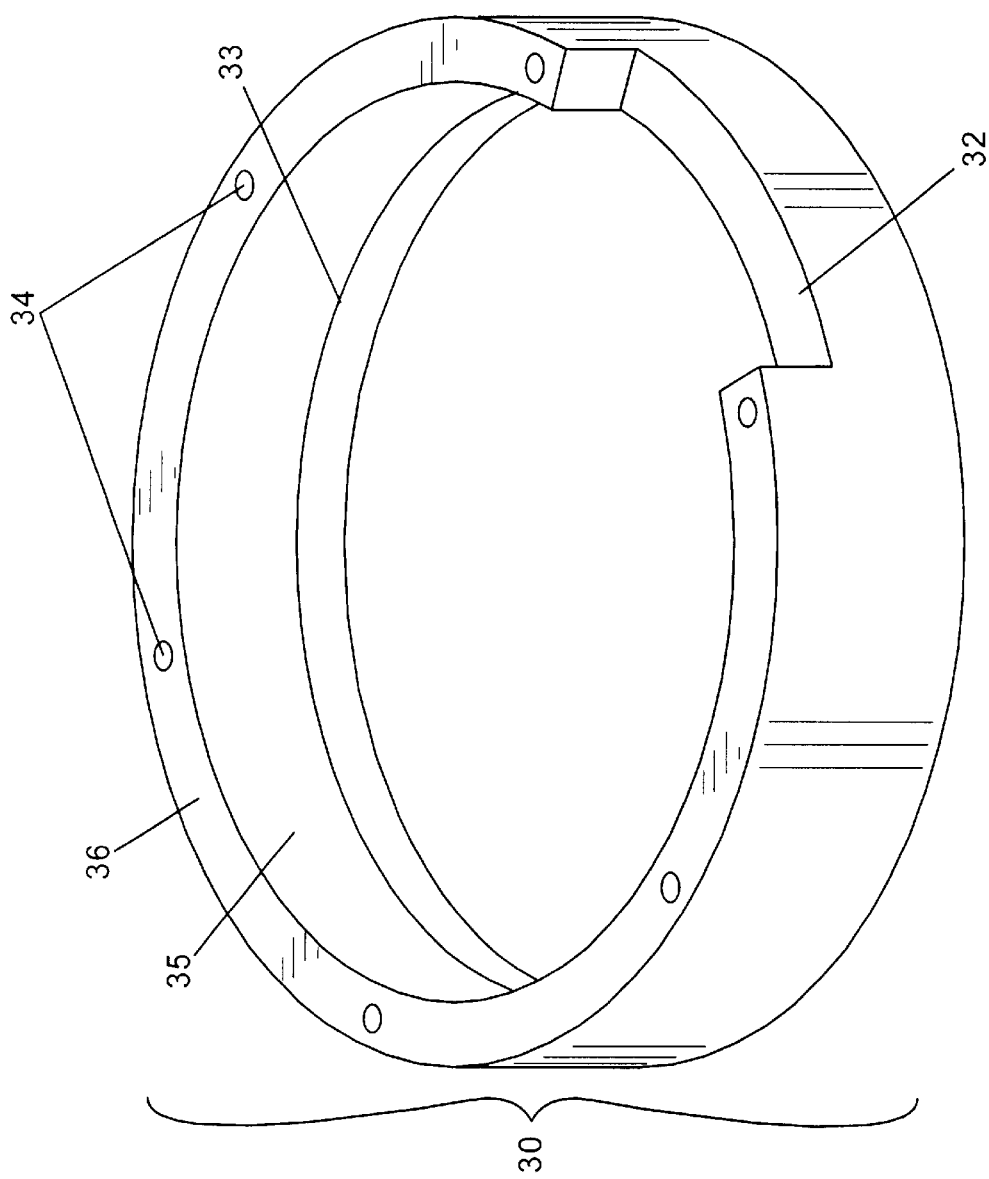
FIG. 3 is a perspective view of an embodiment of the lower compression ring of the rotational shock and vibration testing device.
Figure 4:
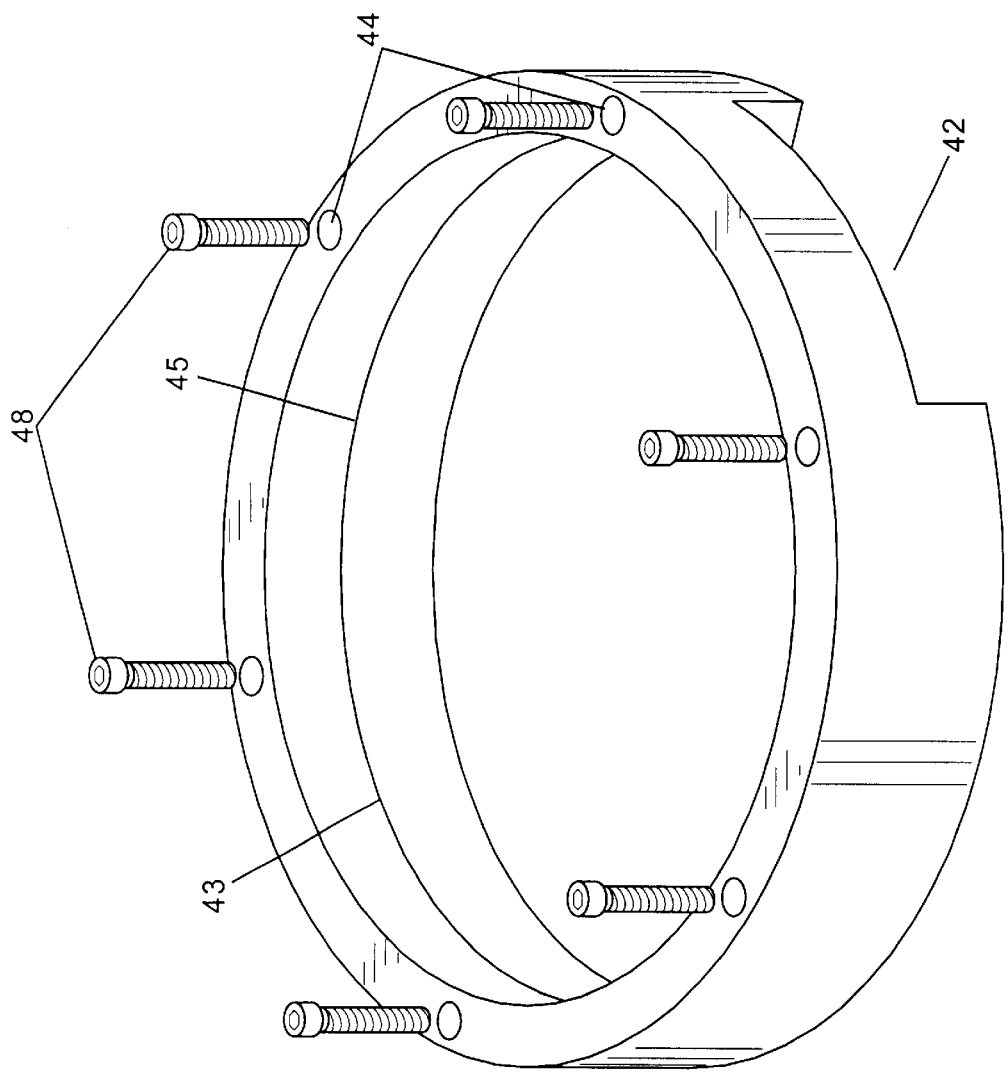
FIG. 4 is a perspective view of an embodiment of the upper compression ring of the rotational shock and vibration testing device.

As seen in FIGS. 3 and 4, the lower compression ring 30 and upper compression ring 40 comprise cylindrical rings sized to fit over the outer ends of the hub 20. The lower compression ring 30 has a recessed area 32 and preferably six thru holes 34 equally spaced on the upper surface 36, although in alternate embodiments, more or fewer holes 34 may be used.

The upper compression ring 40 has a recessed area 42, and preferably six smooth-bore holes 44 that extend entirely through the wall of the compression ring 40 from the top end 46 of the compression ring 40 to the bottom end of the compression ring 40. The holes 44 are equally spaced on the top end 46 of the upper compression ring 40 and align with the six threaded holes 34 on the lower compression ring 30. The upper portion of the holes 44 are countersunk such that the top of the screws 48 do not protrude past the plane of the upper surface 46 of the upper compression ring 40. The screws 48 are preferably stainless steel, but other materials may be useable.

Figure 5:
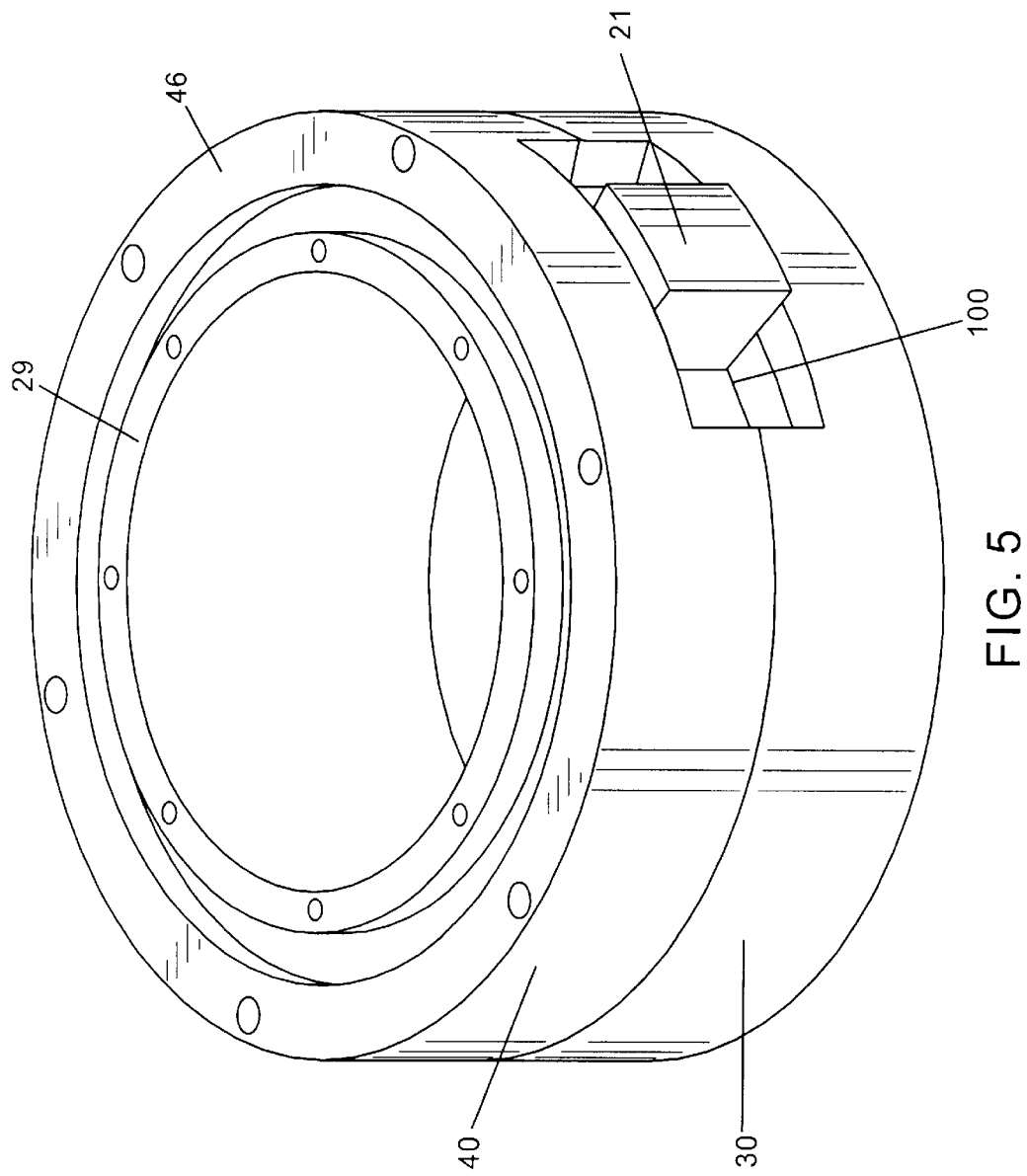
FIG. 5 is a perspective view of the lower and upper compression rings rotationally supporting the hub.

Referring to FIGS. 5 and 6, the hub 20 is rotationally supported between the lower and upper compression rings 30 and 40, with the radial arm 21 protruding through a slot 100 defined by the cut out 32 of the upper compression ring 40, and the adjacent cut out 42 of the lower compression ring 30. The lower and upper compression rings 40 and 30, respectively, are fixedly mounted to each other via the screws 48, which extend through holes 44 in the upper compression ring 40, and into the threaded holes 34 of the lower compression ring 30. The width of the slot 100 is preferably approximately 51 degrees of circumference, but could be sized differently in alternate embodiments, as long as the width is sufficient to allow the desired range of rotation. This is dependent on the available stroke limits of the shaker used.

As best seen in FIG. 3, the lower compression ring 30 includes a shoulder 33 defined in the inner surface 35. Similarly, the upper compression ring 40 includes a shoulder 43 in its inner surface 45. The bearing surfaces or cups 54 and 64 are preferably mechanically pressed onto the outer surface of the hub 20, with the lower bearing cup 54 in snug engagement with the shoulder 33 of the lower compression ring 30, and the upper bearing cup 64 in snug engagement with the shoulder 43 of the upper compression ring 40. As previously mentioned, the ring bearings 50 and 60 are preferably oriented in opposition so that tightening the screws 48 pulls the upper and lower compression rings towards together, squeezing or pre-loading the ring bearings 50 and 60, to eliminate undesirable x, y, or z-axis movement. The use of screws 48 extending through holes 34 and 44 are the current preferred apparatus for pre-loading the bearings 50 and 60, however, in alternate embodiments other known apparatus or means for pre-loading the bearings 50 and 60 may be used.

Figure 7:
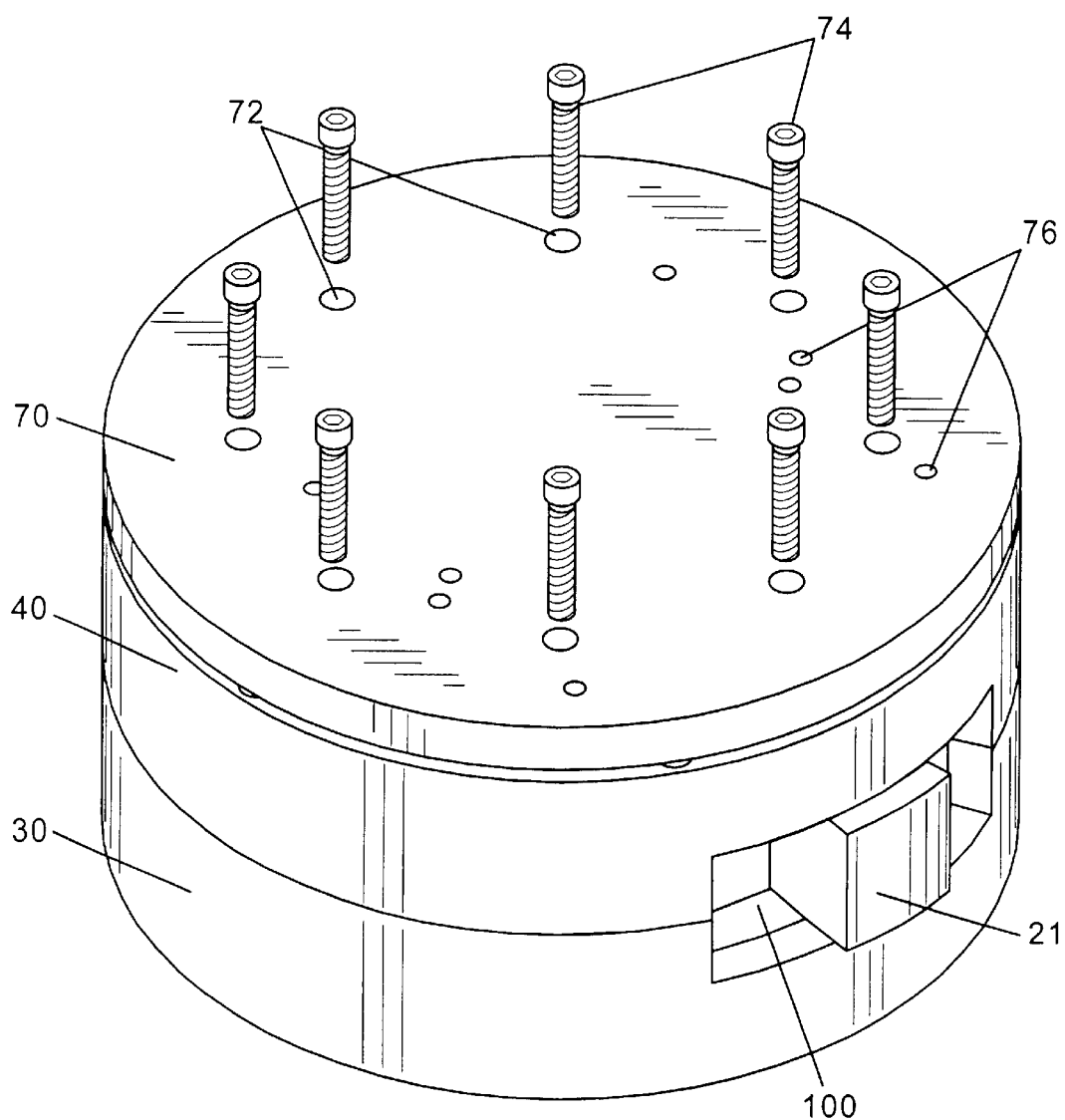
FIG. 7 is a perspective view with the lower and upper compression rings rotationally supporting the hub and the rotating table.

Referring to FIG. 7 the rotating table 70 is preferably a relatively flat circular disk with preferably eight preferably smooth bore holes 72 equally spaced around a circumference of the table 70 in a circular configuration to match the threaded holes 28 on the upper end 29 of the hub 20. Thus, the rotating table is preferable affixed to the hub 20 via screws 74 fitting through the holes 72 in the rotating table 70 and into threaded holes 28 in the upper end 29 of the hub 20. The rotating table 70 is of suitable size and mass to reduce the vibration or ringing that may be experienced by a lighter table 70 when the device is in operation. The holes 72 in the rotating table 70 are preferably countersunk so that the tops of screws 74 do not protrude past the plane of an upper surface of the rotating table 70.

Turning to FIG. 7, the upper surface of the rotating table 70 preferably further includes a plurality of screw holes 76 for securing mechanisms to be tested the rotating table 70. It is understood that the location and configuration of the screw holes 76 on rotating table 70 may vary depending on the size and configuration of the mechanisms to be tested. In some embodiments of the invention the table may include threaded inserts for securing the mechanisms to be tested. Furthermore, in alternate embodiments, one or more fixtures or holding mechanisms may be coupled to the upper surface of the table 70 for grasping or otherwise removeably affixing a device to be tested to the table 70. It is understood that the location and configuration of such fixtures on the surface of the table 70 may varied or configured as needed.

Figure 8:
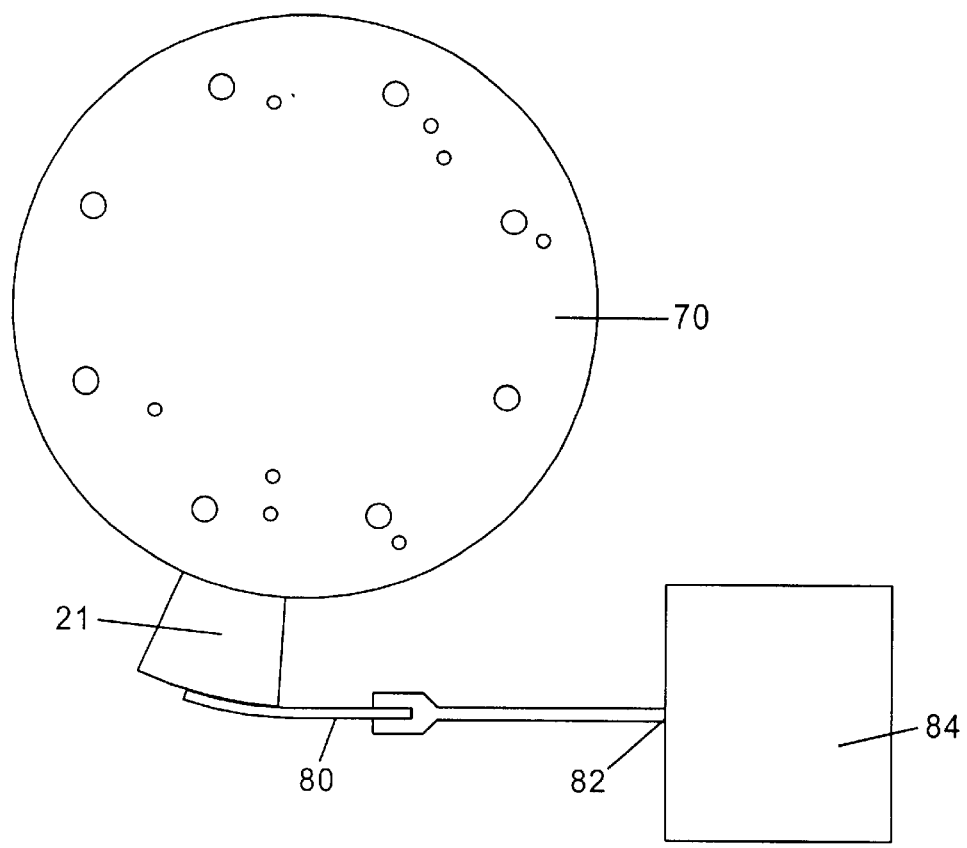
FIG. 8 is a top view of an embodiment the stinger arm attached to the radial arm.

Referring to FIG. 8, a shock delivery system 86 preferably comprises a shock force generating unit 84, and shock force delivery arm 82, which is preferably connected to the radial arm 21 by a flexible transition member 80.

Figure 9:
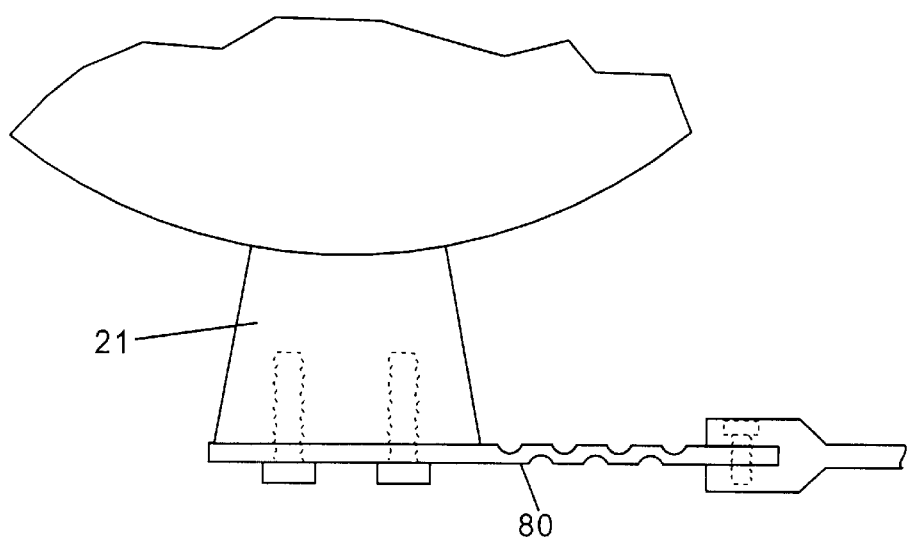
FIG. 9 is a top view of another stinger arm embodiment.

Any desired shock generating unit 84 may be used, however, the currently preferred shock generating unit 84 is an ACG eletrodynamic shaker capable of 1200 lb f and capable of rotating on its axis to supply a horizontal force. The shock force delivery arm 82 is preferably an aluminum beam, although other configurations are useable. The transition member 80, is preferably a stiff but deformable material such as NYLON, DELRIN, or other equivalent material. The flexibility of the transition member 80 preferably allows the transition member 80 to flex as needed to maintain contact with the outer end of the radial arm 21. In alternate embodiments, known hinged or rotatable couplings may be used. To increase flexibility of the transition member 80, the transition member 80 may be scalloped or feathered, as seen in FIG. 9.

When assembled the upper portion of the hub 20 fits through the central aperture in the upper compression ring 40 in snug engagement with the upper ring bearing 60. The lower portion of the hub 20 fits through the central aperture in the lower compression ring 30 in snug engagement with the lower ring bearing 50. When the lower and upper compression rings 30 and 40, respectively, are fixedly mounted to each other, the top end 29 of the hub 20 preferably lies slightly above the upper surface 46 of the upper compression ring 40. The ring bearings 50 and are preferably oriented in opposition so that tightening the screws 48 pulls the upper and lower compression rings towards together, squeezing or pre-loading the ring bearings 50 and 60, to eliminate undesirable movement of the hub 20 vertically along its axis of rotation and preventing movement of the hub horizontally in a plane perpendicular to the axis of rotation.

The force delivery arm 82 connects to the radial arm 21 via the transition member 80, and is coupled at the other end to a force generating unit 84 such as an electrodynamic shaker. When a selected acceleration and velocity is applied to the force delivery arm by the force generating unit, the arm moves relative to the rotary test fixture 10 causing the hub 20 to rotate. The linear acceleration is converted to rotational acceleration based on the radius from the stinger to the center of rotation. Using a deformable transition member 80, as the median between the stinger and hub allows for enough flex during rotation without play fore and aft.

The preferred embodiments described herein are illustrative only, and although the examples given include many specificities, they are intended as illustrative of only a few possible embodiments of the invention. Other embodiments and modifications will, no doubt, occur to those skilled in the art. The examples given should only be interpreted as illustrations of some of the preferred embodiments of the invention, and the full scope of the invention should be determined by the appended claims and their legal equivalents.

What is claimed is:

1. A rotary shock or vibration test device comprising:

a hub including a first end and a second end, and a central axis, a first ring bearing coupled around the hub, a second ring bearing coupled around the hub a first compression ring positioned over and around the first end of the hub and the first ring bearing and including a first bearing surface in contact with the first ring bearing, a second compression ring positioned over and around the second end of the hub and the second ring bearing, and including a second bearing surface in contact with the second ring bearing, apparatus for adjusting the relative distance between the first compression ring and the second compression ring along the central axis of the hub, whereby the first and second ring bearings are pre-loaded to reduce unwanted motion.

2. The rotary shock or vibration test device of claim 1, further comprising a radial arm coupled to the hub.

3. The first compression ring of the rotary shock or vibration test device of claim 2, further comprising a cut through which the radial arm at least partially extends.

4. The second compression ring of the rotary shock or vibration test device of claim 3, further comprising a cut through which the radial arm at least partially extends.

5. The rotary shock or vibration test device of claim 1, wherein the hub is hollow.

6. The rotary shock or vibration test device of claim 1, wherein the hub further comprises a raised collar defining an upper shoulder and a lower shoulder.

7. The rotary shock or vibration test device of claim 6, wherein the first ring bearing is positioned in contact with the upper shoulder, and the second ring bearing is positioned in contact with the lower shoulder.

8. The rotary shock or vibration test device of claim 1, wherein the first and second ring bearings are positioned in opposition.

9. The rotary shock or vibration test device of claim 6, further including a first annular bearing positioned on the hub on one side of the raised collar, and a second annular bearing positioned on the hub on the opposite side of the raised collar.

10. The rotary shock or vibration test device of claim 1, further comprising a force generating assembly for imparting rotational motion to the hub.

11. The rotary shock or vibration test device of claim 10, wherein force generation assembly comprises a force transmission arm coupled to a deformable intermediate member.

12. The rotary shock or vibration test device of claim 11, wherein the deformable intermediate member comprises a material selected form the group: NYLON, and DELRIN.

13. The rotary shock or vibration test device of claim 11, wherein the deformable intermediate member is scalloped or feathered.

14. The rotary shock or vibration test device of claim 10, wherein the force generation assembly comprises an electrodynamic shaker and compatible controller.

\* \* \* \* \*